US012656585B2

(12) United States Patent
Shimizu et al.

(10) Patent No.: US 12,656,585 B2
(45) Date of Patent: Jun. 16, 2026

(54) VARIABLE MAGNIFICATION OPTICAL COMPONENT AND OPHTHALMIC APPARATUS

(71) Applicant: TOPCON CORPORATION, Tokyo (JP)

(72) Inventors: Hitoshi Shimizu, Tokyo (JP); Dai Suzuki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 331 days.

(21) Appl. No.: 18/457,349

(22) Filed: Aug. 29, 2023

(65) Prior Publication Data

US 2024/0111135 A1 Apr. 4, 2024

(30) Foreign Application Priority Data

Sep. 29, 2022 (JP) .................................. 2022-156864

(51) Int. Cl.
*G02B 15/04* (2006.01)
(52) U.S. Cl.
CPC .................................... *G02B 15/04* (2013.01)
(58) Field of Classification Search
None
See application file for complete search history.

(56) References Cited

U.S. PATENT DOCUMENTS

| | | | | | |
|---|---|---|---|---|---|
| 4,486,069 | A | * | 12/1984 | Neil | ........................ G02B 15/10 |
| | | | | | 359/356 |
| 5,282,087 | A | * | 1/1994 | Wickholm | ............. G02B 23/12 |
| | | | | | 250/234 |
| 7,382,526 | B2 | * | 6/2008 | Blechinger | ............ G02B 13/14 |
| | | | | | 359/359 |
| 2007/0086087 | A1 | * | 4/2007 | Dent | .................. G02B 17/0896 |
| | | | | | 359/422 |

FOREIGN PATENT DOCUMENTS

| | | |
|---|---|---|
| JP | H05309072 | 11/1993 |
| JP | 2013135976 | 7/2013 |

* cited by examiner

*Primary Examiner* — Darryl J Collins
(74) *Attorney, Agent, or Firm* — JCIPRNET

(57) ABSTRACT

A variable magnification optical component and an ophthalmic apparatus having a simpler mechanism and requiring a small space are provided. The variable magnification optical component includes an optical path, and a power changer, disposed rotatably with respect to an optical axis of the optical path. The power changer is configured to be removably inserted into the optical path, in which the power changer includes: multiple lenses for varying power and a light beam passage hole configured not to interfere with the lenses. In a first configuration of the variable magnification optical component, the power changer is inclined at a predetermined angle, such that the lenses are retracted outside the optical path, and the optical path passes through the light beam passage hole. In a second configuration of the variable magnification optical component, the power changer is restored and the lenses are positioned on the optical path.

7 Claims, 8 Drawing Sheets

VARIABLE MAGNIFICATION OPTICAL COMPONENT AND OPHTHALMIC APPARATUS

CROSS-REFERENCE TO RELATED APPLICATION

This application claims the priority benefits of Japanese application no. 2022-156864, filed on Sep. 29, 2022. The entirety of the above-mentioned patent application is hereby incorporated by reference herein and made a part of this specification.

BACKGROUND

Technical Field

The disclosure relates to a variable magnification component or variable power optical component and an ophthalmic apparatus having a variable power mechanism.

Description of Related Art

The variable magnification component or variable power optical component (hereafter referred as the variable power component), which allows user to change the magnification of optical components, is typically provided with an apparatus having an optical component, such as an ophthalmic apparatus.

For example, an apparatus having an optical component, such as an eye fundus camera and an Optical Coherence Tomography (OCT) apparatus, which allows us to observe and photograph tomographic images of the eye fundus, has a variable power mechanism.

Conventionally, the variable power mechanism for the apparatus has used various types of optical mechanisms including a zoom lens component or a turret component, which has multiple lenses on a rotatable disc to select a lens by rotating the disc and to insert the lens into the optical path.

All these conventional variable power mechanisms have problems that they have complicated structures and require a large space.

RELATED ART

Patent Documents

[Patent Document 1] Japanese Patent Application Publication No. 5-309072
[Patent Document 2] Japanese Patent Application Publication No. 2013-135976

SUMMARY

The disclosure provides a variable magnification optical component and an ophthalmic apparatus that have a simpler power-change mechanism and require a smaller space.

The disclosure provides a variable power optical component including an optical path; and a power changer, disposed rotatably with respect to an optical axis of the optical path. The power changer is configured to be removably inserted into the optical path, in which the power changer includes: a plurality of lenses for varying power, and a light beam passage hole configured not to interfere with the plurality of lenses. In a first configuration of the variable magnification optical component, the power changer is inclined at a predetermined angle, such that the plurality of lenses are retracted outside the optical path, and the optical path passes through the light beam passage hole. In a second configuration of the variable magnification optical component, the power changer is restored and the plurality of lenses are positioned on the optical path.

Further, according to the disclosure, the variable power optical component further includes a substrate, a power changer assembly including the power changer, a condensing lens assembly including a condensing lens, and an image sensor assembly including an image sensor. The power changer assembly, the condensing lens assembly, and the image sensor assembly are respectively attached to the substrate, so that the power changer assembly is positioned between the condensing lens assembly and the image sensor assembly.

Further, according to the disclosure, the power changer assembly is provided rotatably on a shaft that extends in a direction parallel to the substrate and orthogonal to the optical axis.

Further, according to the disclosure, the substrate is further provided with a turntable that rotates about a vertical axis, and the power changer assembly is provided on the turntable.

Further, according to the disclosure, the substrate is further provided with a turntable that rotates about a vertical axis, the turntable is provided with a shaft that extends in a direction parallel to the substrate and orthogonal to an axis of the power changer assembly, and the power changer assembly is provided rotatably about the shaft.

Further, according to the disclosure, the substrate is formed with an assembly mounting portion corresponding to the power changer assembly, the condensing lens assembly and the image sensor assembly, being configured so that: the assembly mounting portion has an abutting surface for assembly-positioning, and the power changer assembly, the condensing lens assembly and the image sensor assembly are attached in a state of contacting the abutting surface of the corresponding assembly mounting portion, so as to position the power changer assembly, the condensing lens assembly and the image sensor assembly.

The disclosure further provides an ophthalmic apparatus including the above variable power optical component. The variable power optical component includes an optical path; and a power changer, disposed rotatably with respect to an optical axis of the optical path, the power changer configured to be removably inserted into the optical path, wherein the power changer includes: a plurality of lenses for varying power being held by the power changer, and a light beam passage hole configured not to interfere with the plurality of lenses. In a first configuration of the variable magnification optical component, the power changer is inclined at a predetermined angle, such that the plurality of lenses are retracted outside the optical path, and the optical path passes through the light beam passage hole. In a second configuration of the variable magnification optical component, the power changer is restored and the plurality of lenses are positioned on the optical path.

BRIEF DESCRIPTION OF THE DRAWINGS

FIG. 1A and FIG. 1B illustrate the basic configurations of the variable magnification optical component, in which FIG. 1A illustrates the first configuration and FIG. 1B illustrates the second configuration.

FIG. 2A and FIG. 2B are perspective views of the first embodiment of the disclosure, in which FIG. 2A illustrates the first configuration and FIG. 2B illustrates the second configuration.

FIG. 3A and FIG. 3B are cross-sectional views of the first embodiment, in which FIG. 3A illustrates the first configuration and FIG. 3B illustrates the second configuration.

FIG. 5A and FIG. 5B are perspective views of the second embodiment, in which FIG. 5A illustrates the first configuration and FIG. 5B illustrates the second configuration.

FIG. 6A and FIG. 6B are perspective views of the third embodiment, in which FIG. 6A illustrates the first configuration and FIG. 6B illustrates the second configuration.

FIG. 7A and FIG. 7B are perspective views of the fourth embodiment, in which FIG. 7A illustrates the first configuration and FIG. 7B illustrates the second configuration.

DESCRIPTION OF THE EMBODIMENTS

According to the disclosure, in the variable magnification optical component in which the power changer is set into or away from the optical path, the power changer is provided rotatably with respect to the optical axis of the optical path, and the power changer holds a plurality of lenses for varying power and is formed with the light beam passage hole that does not interfere with the plurality of lenses. In the first configuration of the variable magnification optical component, the power changer is inclined at a predetermined angle, the plurality of lenses are retracted outside the optical path, and the optical path passes through the light beam passage hole. In the second configuration of the variable magnification optical component, the power changer is restored and the plurality of lenses are positioned on the optical path. Thus, this structure enables a simpler mechanism of a variable magnification optical component, whose occupied space does not change much between when the power changer is set into the optical path and when the power changer is set away from the optical path.

Hereinafter, embodiments of the disclosure will be described with reference to the drawings.

Figure 1A:
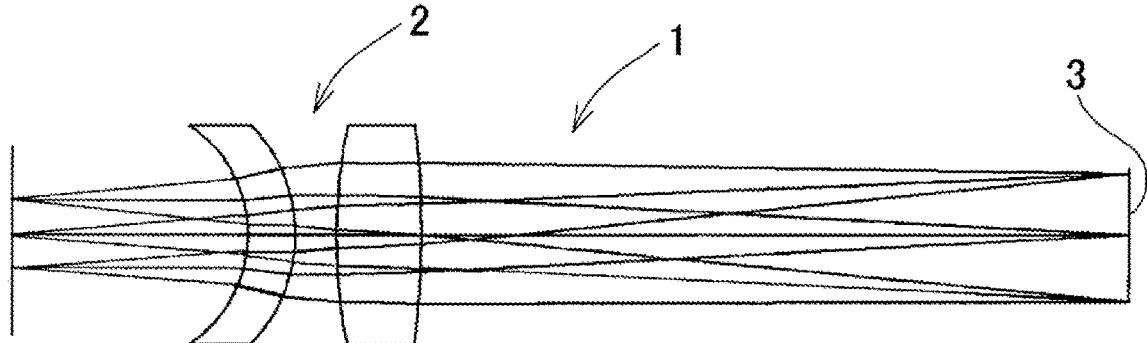
Figure 1B:
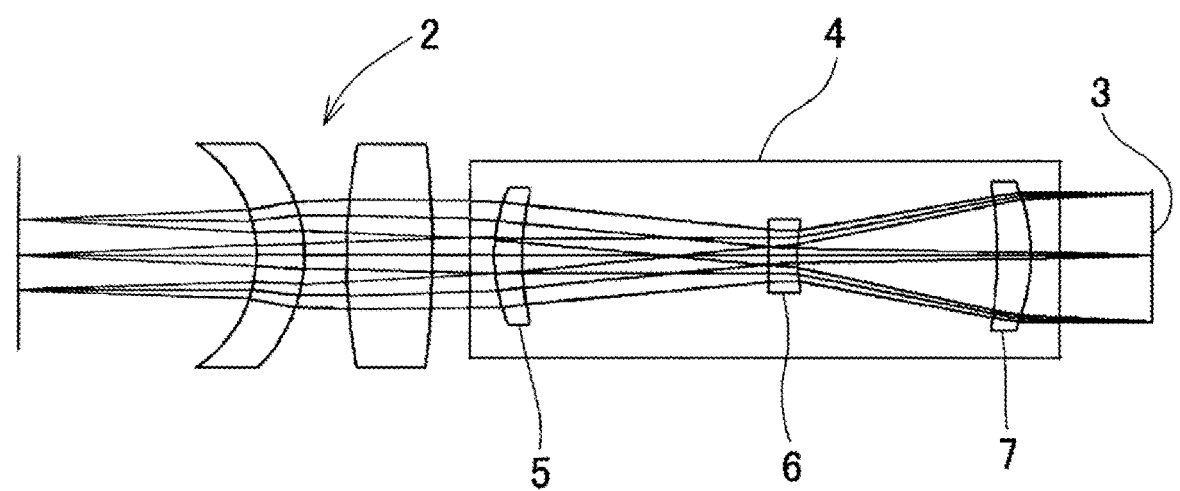

First, a variable magnification optical component will be described referring to FIG. 1A and FIG. 1B. FIG. 1A and FIG. 1B show an optical component 1 of an image acquisition part in an OCT (Optical Coherence Tomography) apparatus as an example of the variable magnification optical component. Details of the OCT apparatus have been disclosed in Japanese Patent Application Publication No. 2013-135976.

With respect to the optical component 1, the OCT apparatus is configured to split a beam of light emitted from a light source into two portions: one portion of the light is called as a reference light, and the other portion enters on the eye fundus, which then reflects back. The fundus-reflected light from the eye fundus and the reference light are combined together as an interference light, which is then received by the optical component 1.

FIG. 1A shows a normal configuration or a first configuration of the optical component 1, in which the optical component 1 provides a reference optical power that is default to the apparatus, and the optical component 1 does not change the optical power as in the following second configuration, and FIG. 1B shows the second configuration of the optical component 1 where the optical power is increased or decreased, or is changed from the normal configuration as the optical component 1 magnifies the target or zooms down the target to see.

A collimating lens, which is not shown in FIG. 1A or FIG. 1B, turns the interference light parallel. A diffraction grating, which is not shown in FIG. 1A or FIG. 1B, allows the interference light to be dispersed or spectrally resolved. Condensing lenses 2 condense the interference light, and finally an image sensor 3 receives the interference light. The diffraction grating may be implemented with a transmissive diffraction grating or a reflective diffraction grating. The image sensor 3 may be a charge coupled device (CCD) image sensor, a complementary metal-oxide semiconductor (CMOS) image sensor, or the like.

In the second configuration, a power changer 4, which includes a plurality of lenses, such as lenses 5, 6, and 7 in this embodiment, to change the optical power of the optical component 1, is set in the optical path between the condensing lens 2 and the image sensor 3.

The specifications, combination, and configuration of the lenses 5, 6, and 7 are determined in accordance with the requirement for the magnification of the power changer 4.

FIG. 2A and FIG. 2B to FIG. 4 show the first embodiment that embodies the optical component 1 shown in FIG. 1A and FIG. 1B.

Figure 2A:
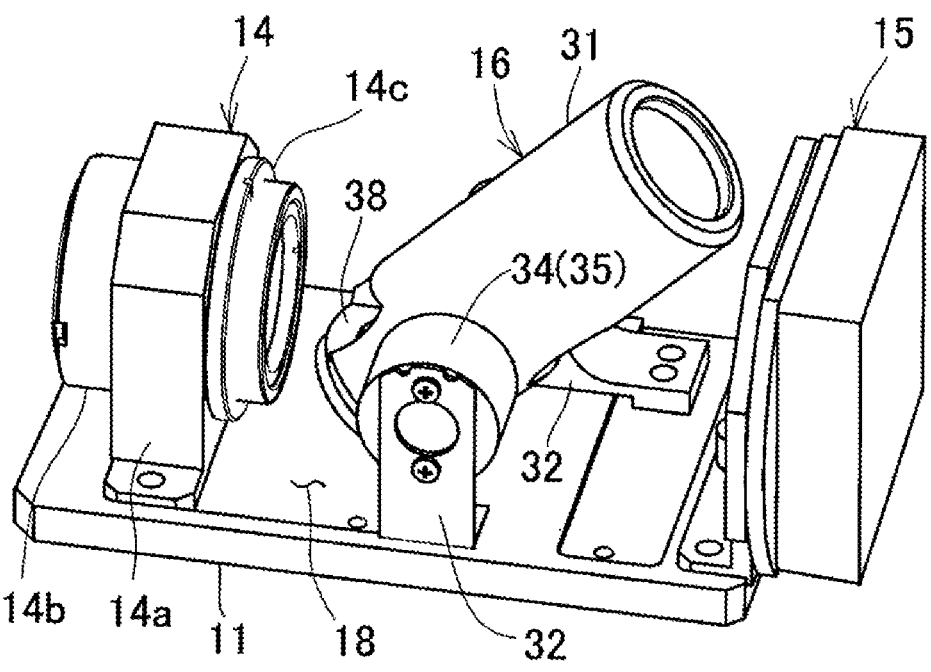
Figure 2B:
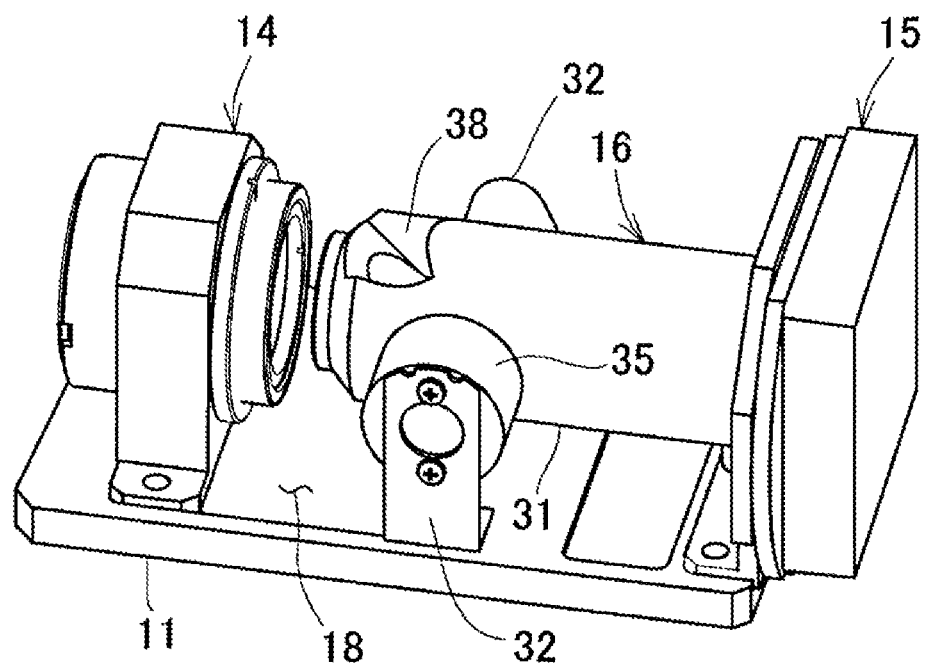

FIG. 2A and FIG. 2B show a substrate 11, on which a condensing lens assembly 14, an image sensor assembly 15, and a power changer assembly 16 are installed.

Figure 4:
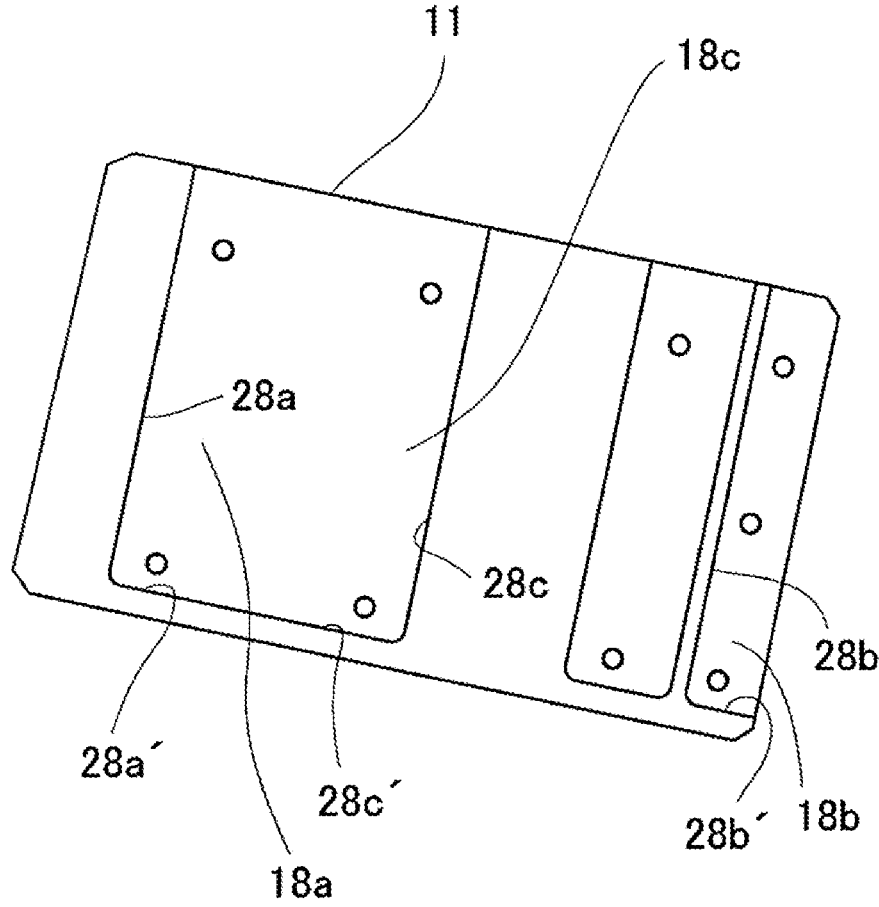
FIG. 4 is a plan view of the substrate for attaching the assemblies.

As shown in FIG. 4, the substrate 11 is formed with an assembly-mounting surface 18 at a predetermined depth, which further includes a first mounting portion 18a, a second mounting portion 18b, and a third mounting portion 18c.

The first mounting portion 18a is a holder for mounting the condensing lens assembly 14, the second mounting portion 18b is a holder for mounting the image sensor assembly 15, and the third mounting portion 18c is a holder for mounting the power changer assembly 16. The first mounting portion 18a to the third mounting portion 18c are respectively shaped to fit each of the assemblies.

Further, each of the first mounting portion 18a to the third mounting portion 18c has marginal walls to abut and hold each of the assemblies.

For example, the first mounting portion 18a, to which the condensing lens assembly 14 is to be mounted, has two marginal walls 28a and 28a', which orthogonally form each other, as the abutting walls, and when the condensing lens assembly 14 is mounted, the condensing lens assembly 14 will abut against the marginal walls 28a and 28a' so that the condensing lens assembly 14 can locate on the substrate 11.

Similarly, the marginal walls 28b and 28b' are the abutting walls for the second mounting portion 18b and the marginal walls 28c and 28c' are the abutting walls for the third mounting portion 18c. When the assemblies 15 and 16 are mounted on the mounting portions 18b and 18c, the assemblies 15 and 16 respectively will abut against the marginal walls 28b and 28b' and the marginal walls 28c and 28c' so that the assemblies 15 and 16 can locate on the substrate 11, and the assemblies 14, 15, and 16 can be located with respect to each other as well.

Each assembly will be described with reference to FIG. 2A, FIG. 2B, FIG. 3A, and FIG. 3B.

The condensing lens assembly 14, including the condensing lens 2, is configured to be independently attachable/detachable from the substrate 11.

The condensing lens assembly 14 includes a holder 14a and a lens barrel 14b that holds the condensing lenses 2. The lens barrel 14b is slidably fitted to the holder 14a and can be fixed with one or some screws. Rotating the lens barrel 14b can finely adjust the optical axis direction of the lens barrel 14b, that is, the condensing lens 2, and the position of the lens barrel 14b can be fixed with a lock nut 14c.

The image sensor assembly 15, including the image sensor 3, is configured to be independently attachable/detachable from the substrate 11. The image sensor 3 can output image data, which will then be input to an image processing device (not shown), a control device (not shown), or other subsequent processing devices to process.

Next, the power changer assembly 16 will be described. The power changer assembly 16 mainly comprises a power-change lens unit 31, which includes the power changer 4; a pair of fixing members 32; and an actuator 34.

The power-change lens unit 31 is rotatably fixed to the substrate 11 on the third mounting portion 18c with the pair of fixing members 32. The power-change lens unit 31 is rotatably attached to the pair of fixing members 32 with a shaft 33 placed in a horizontal direction, which means that the shaft 33 is parallel to the surface of the mounting portion of the substrate 11. In the first embodiment, the shaft 33 is provided with its axis orthogonal to an optical axis O. The axis of the shaft 33 does not have to be placed through the center of the optical axis O. In other words, the axis of the shaft 33 may be vertically displaced from the optical axis O.

The actuator 34 is configured to rotate the power-change lens unit 31 around the shaft 33 in the vertical direction to incline the power-change lens unit 31 at a predetermined angle with respect to the optical axis O. In the first embodiment, the actuator 34 is implemented with a rotary solenoid 35, which rotates back and forth the power-change lens unit 31 to set in and out from the optical path.

FIG. 2A shows the first configuration where the optical power of the optical component 1 is normal.

To change into the first configuration, the rotary solenoid 35 exerts a force for the power-change lens unit 31 to rotate counter-clockwise, which is the direction determined from the views of FIG. 2A and FIG. 2B, from the second configuration by a predetermined angle, which will pull out the lenses 5, 6, and 7 from the optical path, until the power-change lens unit 31 comes into contact with a stopper 36, which is for keeping the power-change lens unit 31 at a position where the optical axis O of the power-change lens unit 31 is inclined at a predetermined angle with respect to the optical axis O.

Figure 3A:
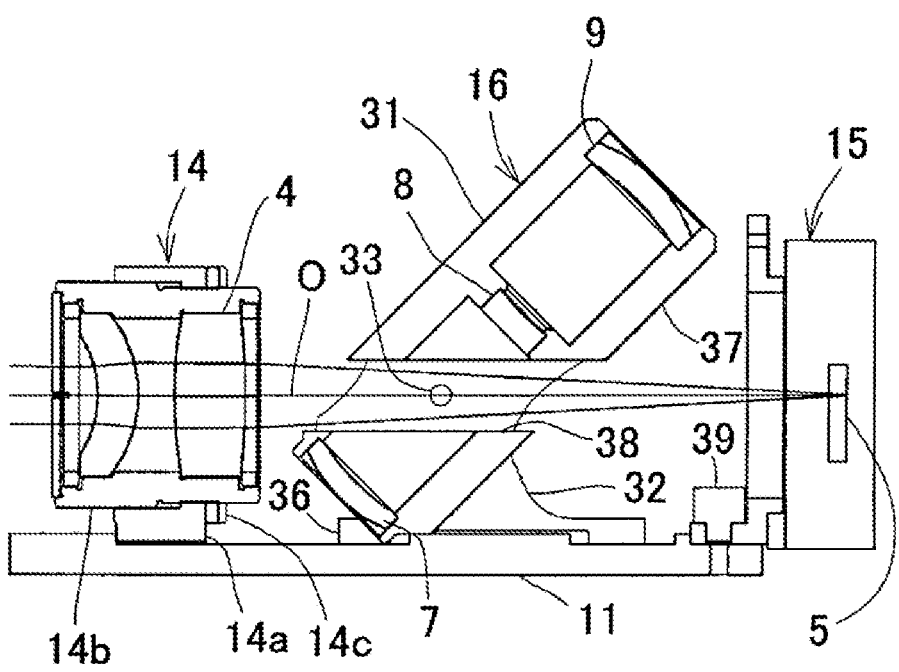

The power-change lens unit 31 will be described with reference to FIG. 3A.

The power-change lens unit 31 allows the light beam to pass through while the power-change lens unit 31 is inclined.

The power-change lens unit 31 has the plurality of lenses, such as lenses 5, 6, and 7 in this embodiment, which are held at predetermined intervals with a lens barrel 37, in which a light beam passage hole 38 is formed between the lens 5 and the lens 6. The light beam passage hole 38 is formed to match the axis of the light beam when the power-change lens unit 31 is inclined, so that the light beam can pass through the light beam passage hole 38.

Figure 3B:
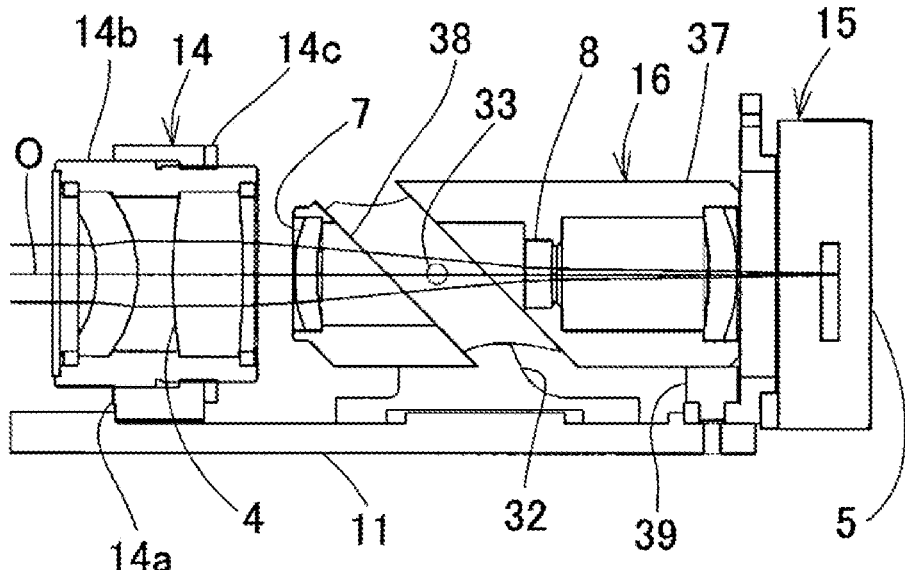

FIG. 2B and FIG. 3B show the second configuration where the power-change lens unit 31 is set in the optical path to change the optical power.

To change into the second configuration, the power-change lens unit 31 is rotated back clockwise, which is the direction determined from the views of FIG. 2A, FIG. 2B, FIG. 3A, and FIG. 3B, by the predetermined angle until the power-change lens unit 31 comes into contact with a stopper 39 so that the light beam can pass through the power-change lens unit 31. When the power-change lens unit 31 is in contact with the stopper 39, the optical axis of the power-change lens unit 31 accurately coincides with the optical axis of the light beam. The lenses 5, 6, and 7 change the power of the light beam, which enters onto the image sensor 3.

This embodiment enables the switching of the optical power back and forth by simply rotating back and forth the power-change lens unit 31 around the horizontal axis (the shaft 33) by a predetermined angle (for example, roughly 45°), which can be implemented with a simple support configuration that has a simple actuator.

In addition, this embodiment allows the power changer to minimize the space it requires because the end of the power-change lens unit 31 slightly bulges out upward in the first configuration, and the space required for the power-change mechanism does not differ between the first configuration and the second configuration.

Figure 5A:
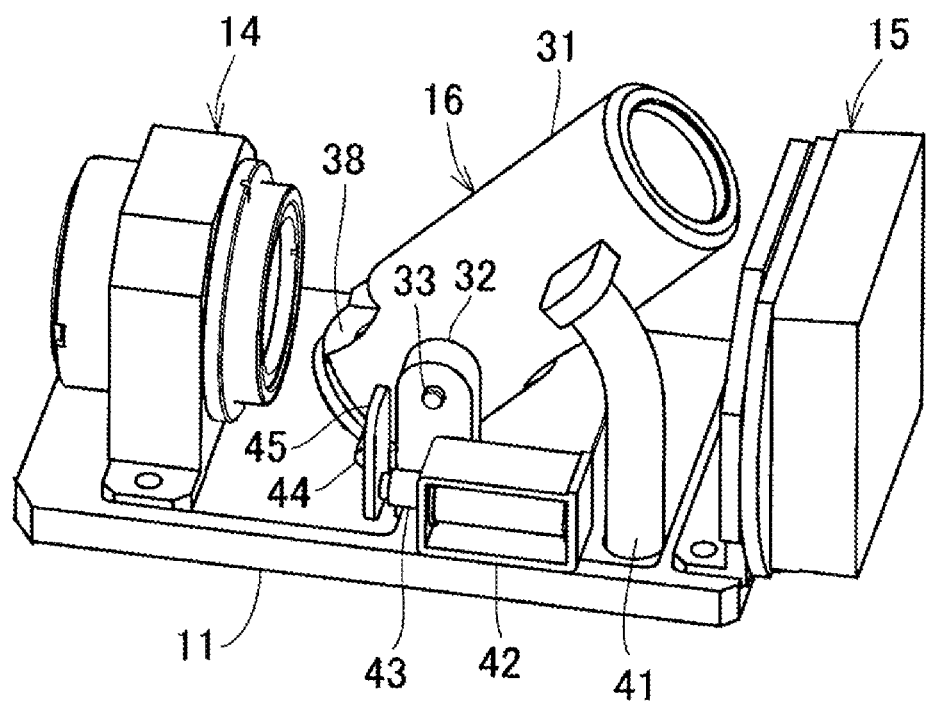
Figure 5B:
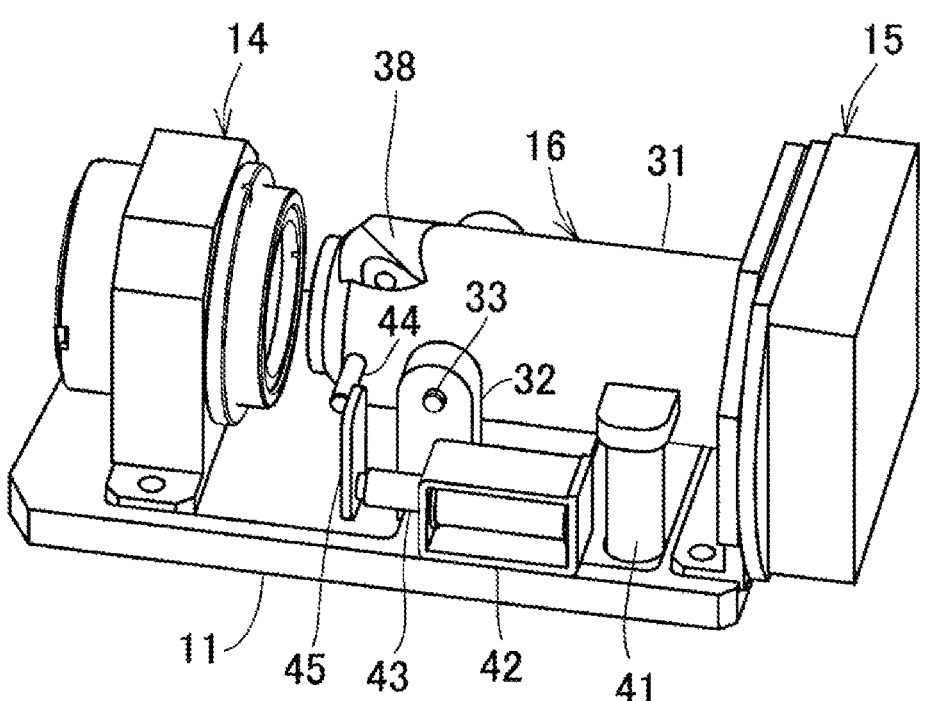

The second embodiment is shown in FIG. 5A and FIG. 5B, in which the same reference numbers are used for the same components as in FIG. 2A and FIG. 2B.

The second embodiment employs a push solenoid, instead of the actuator 34 in the first embodiment.

A compression spring 41, which bridges across between the substrate 11 and the power-change lens unit 31 on the proximal part toward the image sensor 3, is provided to urge the power-change lens unit 31 in the counterclockwise direction, which is the direction determined from the views of FIG. 5A and FIG. 5B.

A push solenoid 42, which is mounted on the substrate 11 and to a lateral side of the power-change lens unit 31, allows a plunger 43 to project forward in the parallel direction to the optical axis. A pin 44, which is mounted on the power-change lens unit 31 on the proximal part toward the condensing lens assembly 14, and a push plate 45 is mounted on the tip of the plunger 43 to contact with the pin 44.

To change into the first configuration, the push solenoid 42 allows the plunger 43 to retract so that the plunger 43 shall exert no force to the pin 44, and the compression spring 41 shall urge the power-change lens unit 31 so that the power-change lens unit 31 shall rotate counterclockwise, which is the direction determined from the views of FIG. 5A and FIG. 5B. Thus, the light beam can pass through the light beam passage hole 38, which is the same as described in the first embodiment.

To change into the second configuration, the push solenoid 42 pushes the plunger 43 to exert a horizontal force on the pin 44 which pushes the pin 44 in the horizontal direction and allows the pin 44 to slide on the push plate 45, which exerts a clockwise rotational force to the power-change lens unit 31. The power-change lens unit 31 will rotate back clockwise to a certain position so that the light beam can pass though the power change unit 31, which is the same as described in the first embodiment.

In the second embodiment, the power-change lens unit 31 is rotated by a predetermined angle by the driving force of the push plate 45, which the push solenoid 42 has pushed, and is then returned by the urging force of the compression spring 41, which can achieve a simpler power switching mechanism and requires a smaller space.

Although a rotary solenoid and a push solenoid are used as an actuator in the first embodiment and the second embodiment, these implementations are not limited to the solenoid mechanism, but other actuators including one with motors and cylinders may be used.

Figure 6A:
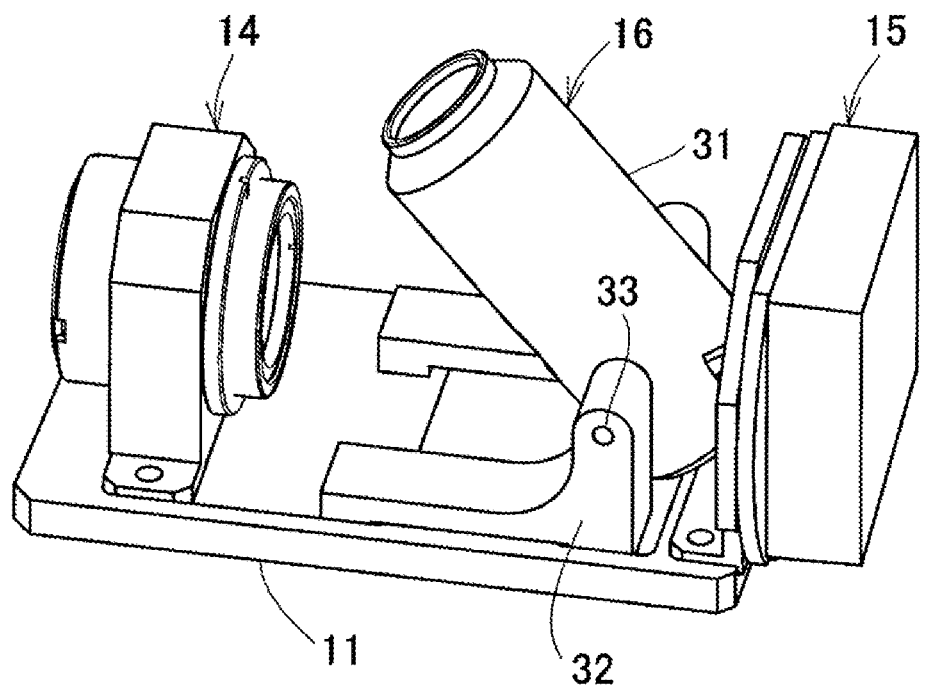
Figure 6B:
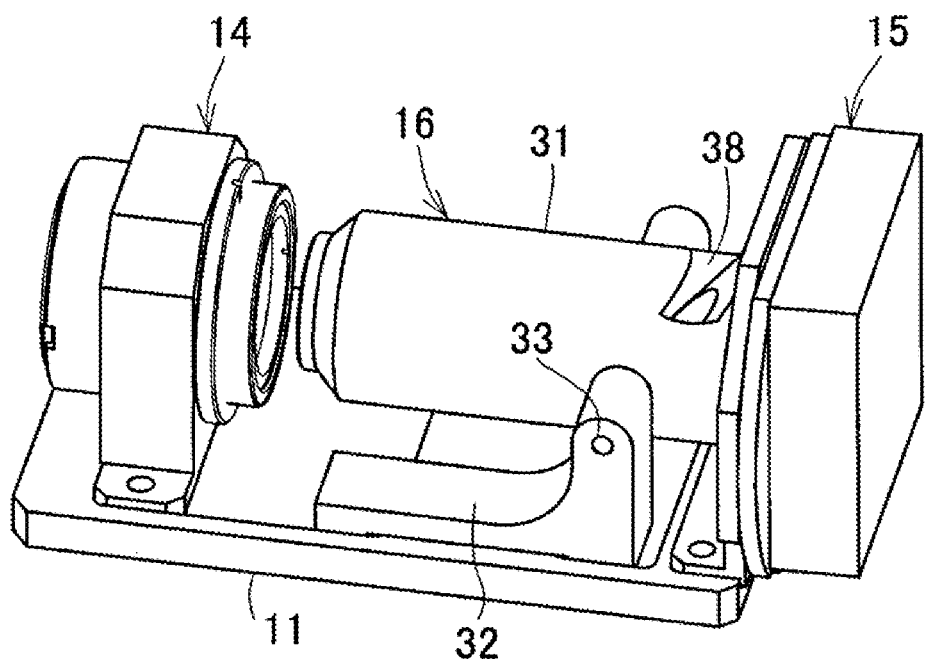

The third embodiment is shown in FIG. 6A and FIG. 6B, in which the same reference numbers are used for the same components as in FIG. 2A and FIG. 2B. An actuator is purposely not shown in FIG. 6A or FIG. 6B since some mechanisms are employed as similarly as described in the first or second embodiment to rotate the power-change lens unit 31 back and forth.

The third embodiment shows an embodiment that the light beam passage hole 38 is formed in the lens barrel 37 in a position that is between the lens 6 and the lens 7, instead of a position that is between the lenses 5 and 6 in the first and second embodiments.

The specifications, combination and configuration of the lenses 5, 6, and 7 are determined in accordance with the requirement for the magnification of the power changer 4. Therefore, the optimum position for forming the light beam passage hole 38 is determined depending on the specifications, combination, and configuration of the lenses 5, 6, and 7.

Figure 7A:
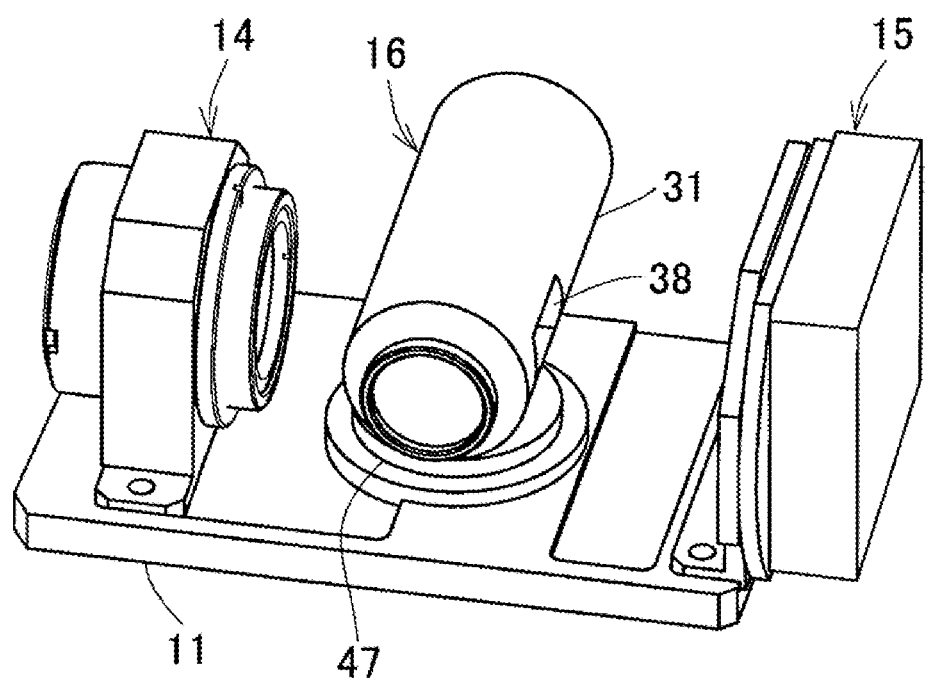
Figure 7B:
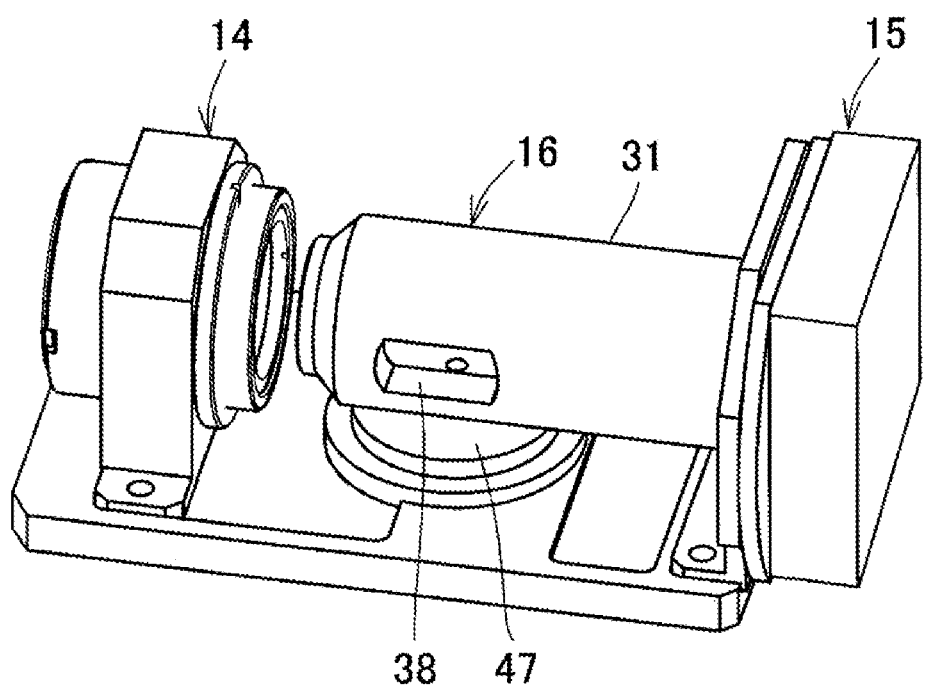

The fourth embodiment is shown in FIG. 7A and FIG. 7B, in which the same reference numbers are used for the same components as in FIG. 2A and FIG. 2B. An actuator is purposely not shown in FIG. 7A or FIG. 7B.

Unlike the power-change lens unit 31 that is rotated vertically around the horizontal axis in the first, second, and third embodiments, the fourth embodiment is configured to rotate the power-change lens unit 31 horizontally around the vertical axis. That is, the power changer assembly 16 rotates horizontally around the vertical axis.

A turntable 47 is provided on the substrate 11 to be rotatable around the vertical axis, and the power-change lens unit 31 is attached on the turntable 47.

The turntable 47 can be rotated in the horizontal direction by a predetermined angle (90° in FIG. 7A) by an actuator (not shown). The first configuration is that the power-change lens unit 31 is rotated by 90°, so that the light beam passage hole 38 shall coincide with the optical axis and the light beam can pass through the light beam passage hole 38.

In the second configuration, the power-change lens unit 31 is returned by the predetermined angle so that the optical axis of the power-change lens unit 31 coincides with the optical axis O of the light beam and the light beam can pass through the power-change lens unit 31.

The light beam passage hole 38 may be formed somewhere else among the lenses 5, 6, and 7 unless the light beam passage hole 38 interferes with any of the lenses 5, 6, and 7. The rotation angle of the power-change lens unit 31 may be changed, for example, to roughly 45°, and may be any angle as long as the light beam passage hole 38 does not interfere with the optical axis of the power-change lens unit 31 and any of the lenses 5, 6, and 7 therein.

Figures 8A, 8B:
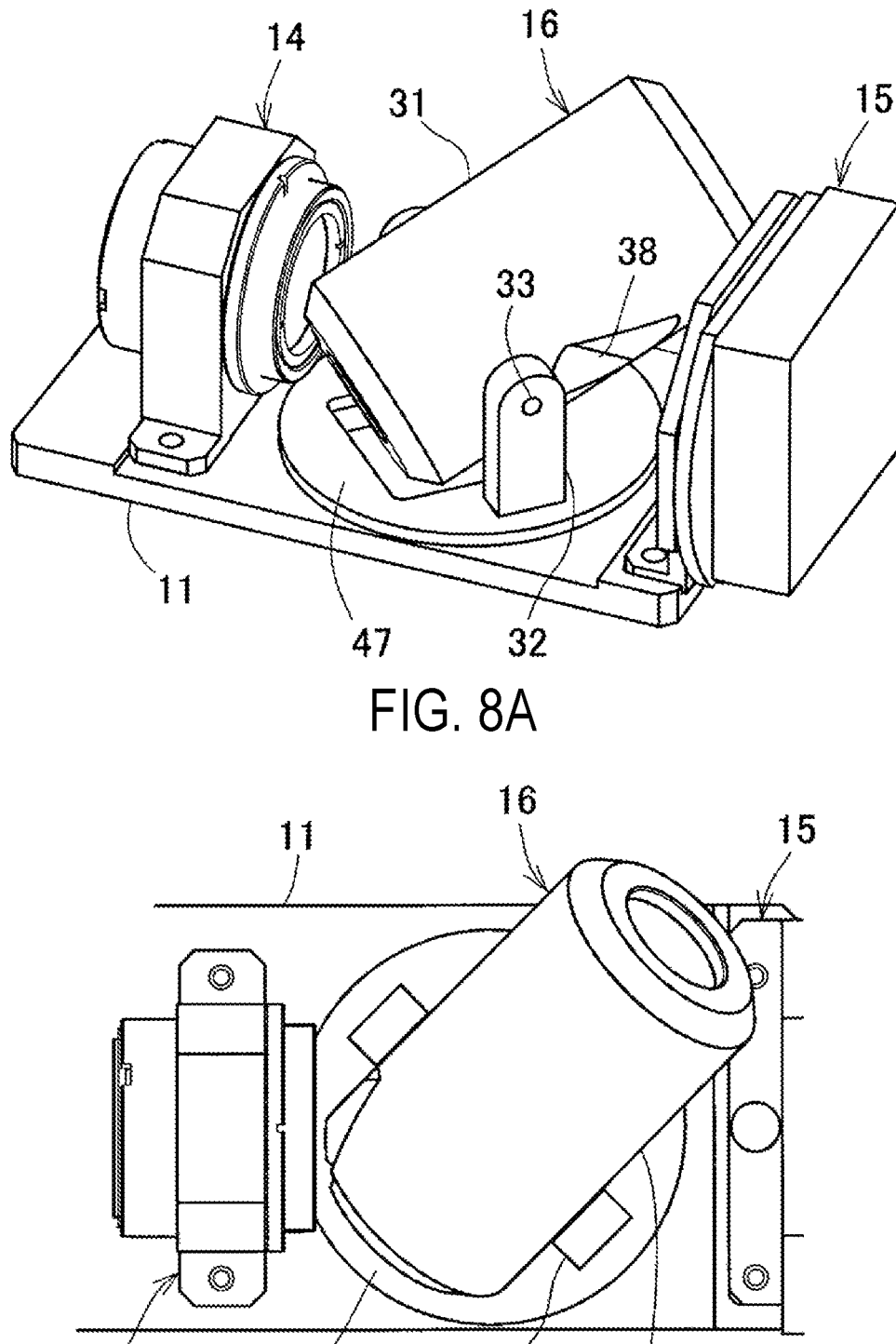
FIG. 8A is a perspective view of the fifth embodiment in the first configuration.
FIG. 8B is a plain view of the portion of the power changer assembly in the first configuration.

FIG. 8A and FIG. 8B show another example of the fourth embodiment that the optical axis of the power changer assembly 16 is inclined both horizontally and vertically by combining rotation in the vertical direction and rotation in the horizontal direction.

A turntable 47 is provided on the substrate 11 to be rotatable in the horizontal direction around the vertical axis, and a power-change lens unit 31 is attached on the turntable 47 with a pair of fixing members 32 so that the power-change lens unit 31 can rotate in the horizontal direction. The power-change lens unit 31 is provided on the pair of fixing members 32 via the shaft 33 so that the power-change lens unit 31 can rotate in the vertical direction. The shaft 33 is placed in a direction orthogonal to the optical axis of the power-change lens unit 31.

A light beam passage hole 38 is formed in the power-change lens unit 31. Rotating the power-change lens unit 31 by a predetermined angle in the horizontal direction and by a predetermined angle in the vertical direction allows the axis of the light beam passage hole 38 to coincide with the optical axis of the light beam, so that the light beam can pass through the light beam passage hole 38.

In this embodiment, to change into the first configuration, the power-change lens unit 31 is rotated and inclined at a predetermined angle so that the light beam can pass through the light beam passage hole 38. The rotation angle, the rotation direction, the support structure of the power-change lens unit 31, etc. are not limited to the above embodiments as long as the light beam passage hole 38 can be formed without interfering with the lenses held in the power-change lens unit 31.

In addition, although the power changer 4 is provided between the condensing lens 2 and the image sensor 3 in the above embodiments, the power changer 4 may be provided anywhere as long as the optical component is applicable.

Furthermore, although the embodiments describe the applications for an ophthalmic apparatus, the disclosure is not limited to use in an ophthalmic apparatus and can be applied to various apparatuses that provide a variable power function, such as a surveying apparatus and a testing apparatus.

What is claimed is:

1. A variable magnification optical component having a horizontal direction and a vertical direction, comprising:
   an optical path; and
   a power changer, disposed rotatably with respect to an optical axis of the optical path, the power changer configured to be removably inserted into the optical path, wherein the power changer includes: a plurality of lenses for varying power, and a light beam passage hole configured not to interfere with the plurality of lenses, wherein
   the power changer is rotatably installed with a shaft placed in the horizontal direction,
   the shaft extends in a direction parallel to the horizontal direction and orthogonal to the optical axis,
   the power changer is configured to rotate counter-clockwise or clockwise around the shaft in the vertical direction,
   in a first configuration of the variable magnification optical component that the power changer rotates counter-clockwise, the power changer is inclined at a predetermined angle with respect to the optical axis, such that the plurality of lenses are retracted outside the optical path, and the optical path passes through the light beam passage hole, and
   in a second configuration of the variable magnification optical component that the power changer rotates clockwise, the power changer is restored and the plurality of lenses are positioned on the optical path.

2. The variable magnification optical component according to claim 1, further comprising:
   a substrate;
   a power changer assembly including the power changer;
   a condensing lens assembly including a condensing lens; and
   an image sensor assembly including an image sensor, wherein the power changer assembly, the condensing lens assembly, and the image sensor assembly are respectively attached to the substrate, so that the power changer assembly is positioned between the condensing lens assembly and the image sensor assembly.

3. The variable magnification optical component according to claim 2, wherein the power changer assembly is provided rotatably on the shaft that extends in the direction parallel to the substrate and orthogonal to the optical axis.

4. The variable magnification optical component according to claim 2, wherein the substrate is further provided with a turntable that rotates about a vertical axis, the turntable is provided with the shaft that extends in the direction parallel to the substrate and orthogonal to an axis of the power changer assembly, and the power changer assembly is provided rotatably about the shaft.

5. An ophthalmic apparatus, characterized in that comprising:

the variable magnification optical component according to claim 1, wherein the plurality of lenses for varying power is held by the power changer.

6. A variable magnification optical component, comprising:

an optical path;

a power changer, disposed rotatably with respect to an optical axis of the optical path, the power changer configured to be removably inserted into the optical path, wherein the power changer includes: a plurality of lenses for varying power, and a light beam passage hole configured not to interfere with the plurality of lenses;

a substrate;

a power changer assembly including the power changer;

a condensing lens assembly including a condensing lens; and an image sensor assembly including an image sensor, wherein the power changer assembly, the condensing lens assembly, and the image sensor assembly are respectively attached to the substrate, so that the power changer assembly is positioned between the condensing lens assembly and the image sensor assembly, wherein in a first configuration of the variable magnification optical component, the power changer is inclined at a predetermined angle, such that the plurality of lenses are retracted outside the optical path, and the optical path passes through the light beam passage hole, and in a second configuration of the variable magnification optical component, the power changer is restored and the plurality of lenses are positioned on the optical path, wherein the substrate is formed with an assembly mounting portion corresponding to the power changer assembly, the condensing lens assembly and the image sensor assembly, being configured so that:

the assembly mounting portion has an abutting surface for assembly-positioning, and the power changer assembly, the condensing lens assembly and the image sensor assembly are attached in a state of contacting the abutting surface of the corresponding assembly mounting portion, so as to position the power changer assembly, the condensing lens assembly and the image sensor assembly.

7. An ophthalmic apparatus, characterized in that comprising:

the variable magnification optical component according to claim 6, wherein the plurality of lenses for varying power is held by the power changer.

* * * * *